United States Patent Office 3,564,842
Patented Feb. 23, 1971

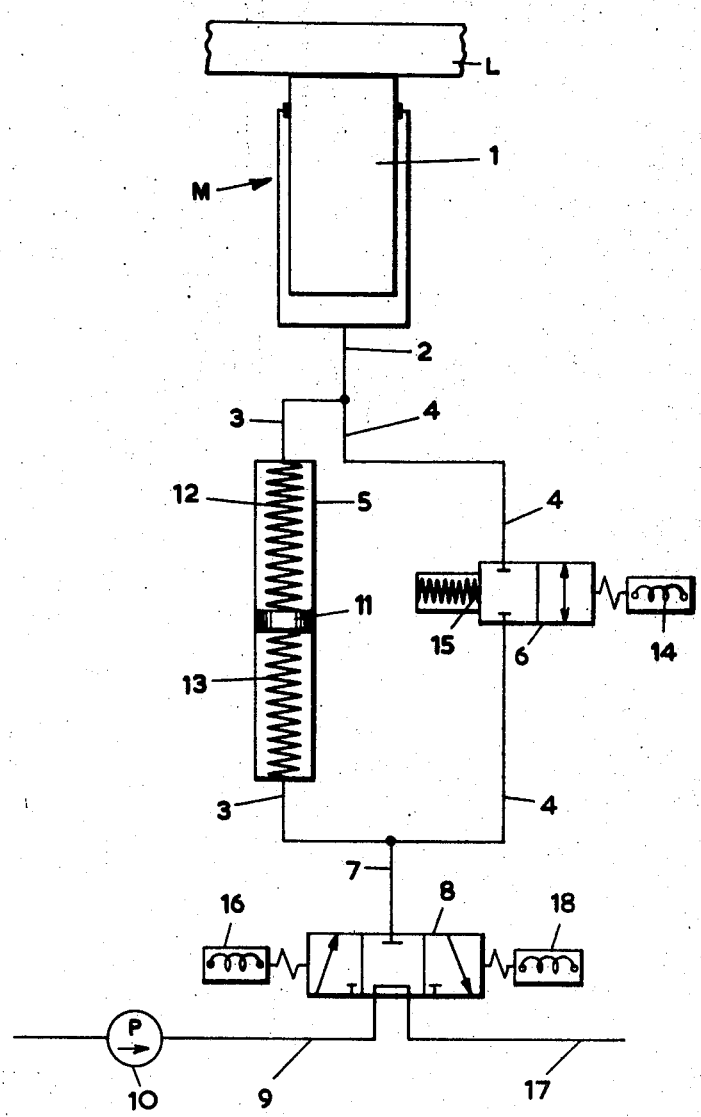

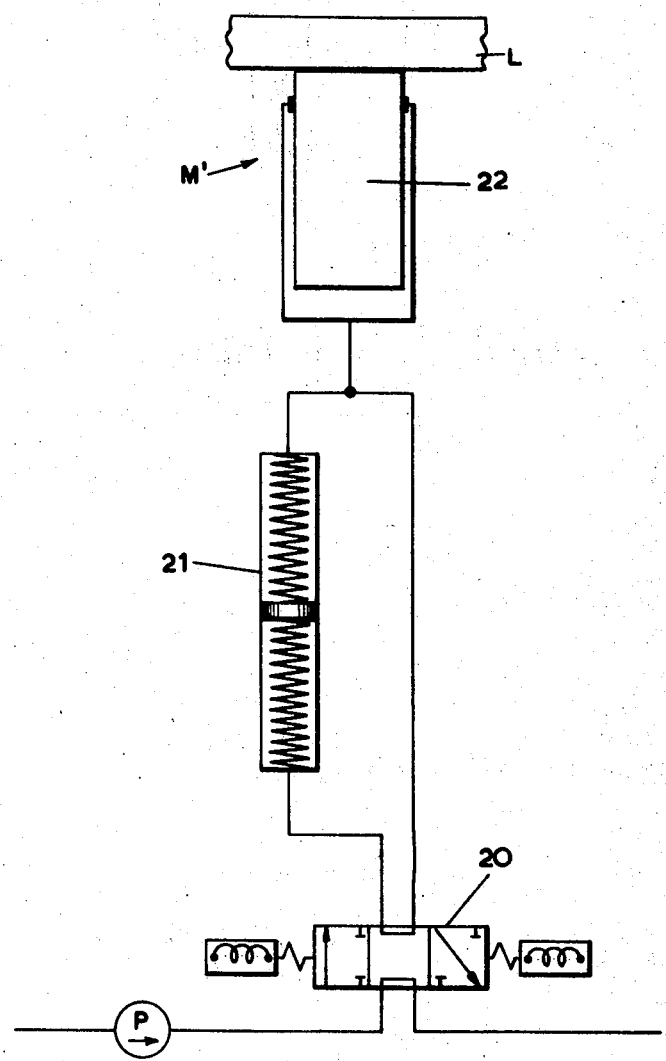

3,564,842
CONTROL SYSTEM FOR FLUID-OPERATED POSITIONING MECHANISM
Nicolaas G. J. W. Van Marle, Dordrecht, Netherlands, assignor to Aviolanda Maalschappij Voor Vliegtuigbouw N.V., Papendrecht, Netherlands, a corporation of the Netherlands
Filed July 9, 1968, Ser. No. 743,402
Claims priority, application Netherlands, July 14, 1967, 6709808
Int. Cl. F15b 7/00; F01b 31/00
U.S. Cl. 60—10.5
2 Claims

ABSTRACT OF THE DISCLOSURE

A fluid power operated control system for operating a mechanism including an element adapted to be subjected to an automatically proceeding movement under the control of said control system, characterized by a metering cylinder included in the power fluid circuit which controls the movement of said element, said metering cylinder being arranged, after the adjustment of an energizing command circuit, to allow a limited quantity of power fluid to flow through said power fluid circuit, and to allow the throughflow of a further like limited quantity of power fluid only after a mutation in said command circuit.

---

This invention relates to a fluid power operated control system for operating a mechanism including an element adapted to be subjected to an automatically proceeding displacement under the control of said control system.

The invention relates particularly to the safeguarding against undesirable displacements of such an element. An example of an element to be safeguarded against undesirable displacements is a loading chute which must give access to an airplane. The end of such a chute must continually be adapted to the varying height of the airplane during loading or unloading, which requires one or more commands being given to the fluid power operated system for the latter to cause the chute to follow the airplane. This following movement must preferably be effected entirely automatically and without the supervision of an operator. A very important aspect in this connection is that a following movement, once begun, should not proceed too far, which could be the case upon failure of the mechanism which must automatically stop the movement. A movement which proceeds too far may cause accidents and great damage.

It is an object of the present invention to provide an apparatus which is safeguarded against undesirable or incorrectly continuing movements.

In the control system according to the invention, this safeguarding is achieved by means of a metering cylinder included in the power fluid circuit which controls the movement of said element, said metering cylinder being arranged, after the adjustment of an energizing command circuit, to allow a limited quantity of power fluid to flow through said power fluid circuit, and to allow the throughflow of a further like limited quantity of power fluid only after a mutation in said command circuit. Preferably this system is arranged with a metering cylinder including a free piston therein which is spring-biased to an initial position, as well as shut-off means adapted to disconnect the two sides of the piston from a source of power fluid and/or discharge branch, thereby short-circuiting the two sides of the piston in a closed circuit to permit the return of the piston to its initial position. In order to exclude any error, it is possible in this arrangement for all said shut-off means to be combined in a fixed mechanical relationship. In order to permit a greater variation of uses of the system, while maintaining a great degree of safety, the system may be so arranged that the switch means for energizing the individually energizable shut-off means are mechanically or electrically interlocked.

The invention will be further described with reference to the accompanying drawings. In said drawings:

FIG. 1 shows a diagram of a circuit including a metering cylinder for limiting, according to the invention, the displacement of a plunger which for example, controls the following movement of a loading chute; and FIG. 2 shows a diagram of a modification of said circuit.

Referring to FIG. 1, there is shown a fluid motor M including a plunger 1 designed for raising and lowering a load L, for example, a loading chute. The connection of the pressure space under the plunger 1 goes via conduit 2, parallel conduits 3 and 4, with a metering cylinder 5 being included in the conduit 3 and a two-port slide 6 being included in the conduit 4, further conduit 7, which connects with three-port slide 8, which is connected with conduit 9, in which is included a pump 10.

Mounted in the metering cylinder 5 is a free piston 11 between two springs 12, 13 which tend to keep the piston 11 in, or bring it into, an initial position coinciding with the middle position.

The slide 6 can occupy two positions, namely, a connecting position, by means of electric energization at 14 and a shut-off position in the absence of energization at 14, as a result of the reset spring 15.

The slide 8 can occupy three positions, namely, a middle position as a result of a permanent spring bias in the absence of electric energization, a position for connection with pump 10 by means of electric energization at 16, and a position for connection with discharge branch 17 by means of electric energization at 18.

In the circuit combination in which the slide 6 is kept in its shut-off position by the spring 15 and the slide 8 is kept in the position for connection with the pump 10 by energization at 16, the piston 11 is displaced upwardly, as viewed in FIG. 1, by the pressure fluid which enters at the bottom side, so that the pressure fluid at the other side of the piston 11 is also displaced and moves the plunger 1 upwardly, which movement normally ends owing to the slide 8 being moved to its middle position by the automatic control mechanism, while at the same time the slide 6 is moved to its open position. Upon failure of the control mechanism the piston 11 will move further, which movement will then necessarily end, however, as soon as the piston 11 reaches an end position in the top of the cylinder 5, the pressure fluid on the pump side escaping elsewhere through a relief valve not shown. Further displacement of the plunger 1 requires the piston 11 to be first returned some way, or fully, to its initial position. For this purpose the energization at 16 is switched off and the energization at 14 is switched on, as a consequence of which the conduits 3 and 4 will form a closed circuit which has no connection with the conduits 9 and 17. The springs 12 and 13 then return the piston 11 to its initial position with circulation of the fluid enclosed in the conduits 3, 4, without any displacement of the plunger 1. Thereafter the first-mentioned circuit combination can again be activated to re-initiate the above-described drive cycle of the plunger 1.

When the cycle for the opposite movement of the plunger 1, driving the load carried by the plunger 1, proceeds normally, the slide 8 is energized at 18 instead of at 16, to create a connection with the discharge branch 17. The stroke is then limited by the piston 11 reaching the lowermost position in the diagram. The piston 11 is returned to its initial or middle position when the slide 8 has been adjusted to its middle position and the slide 6 to its connecting position.

By keeping the slide 6 constantly in its connecting position, the automatic stroke limiting means 5, 11, 12, 13 as such can be kept out of operation. If this possibility is not desired, this can be prevented by interlocking the electric circuits. This possibility, if undesired, may also be excluded entirely mechanically, by combining the shut-off and let-through combinations in a single three position slide valve.

FIG. 2 illustrates a diagram incorporating such a slide 20, designed for bilateral electric actuation and spring-biased to a middle position, which slide, in combination with the metering cylinder 21, only enables the limited-stroke operation of the plunger 22 in a fluid motor M'.

It goes without saying that the stroke limiting means can find application in various manners.

I claim:

1. A fluid power operated control system for adjustably positioning a load, said control system comprising a fluid motor having a plunger for engagement with said load, pump means for supplying pressure fluid to said fluid motor, a metering cylinder operatively located between said fluid motor and said pump means, said metering cylinder including a free piston and spring means for biasing said free piston to an initial position within said metering cylinder, valve means operatively located between said pump means and said metering cylinder for directing pressure fluid against said free piston to displace said free piston from said initial position for supplying a limited amount of pressure fluid to said fluid motor, conduit means connected across said metering cylinder and a second valve means in said conduit means for connecting opposite sides of said metering cylinder together such that said spring means return said free piston to said initial position.

2. A fluid power operated control system for adjustably positioning a load, said control system comprising a fluid motor having a plunger for engagement with said load, pump means for supplying pressure fluid to said fluid motor, a metering cylinder operatively located between said fluid motor and said pump means, said metering cylinder including a free piston and spring means for biasing said free piston to an initial position within said metering cylinder, valve means operatively located between said pump means and said metering cylinder for directing pressure fluid against said free piston to displace said free piston from said initial position for supplying a limited amount of pressure fluid to said fluid motor, said valve means being comprised of a three-position slide valve, valve, and a conduit means connected across said metering cylinder through said slide valve such that said spring means return said free piston to said initial position.

References Cited

UNITED STATES PATENTS

| | | | |
|---|---|---|---|
| 2,988,306 | 6/1961 | Kutzler | 60—10.5 |
| 1,817,552 | 8/1931 | Galloway | 91—27 |
| 3,091,140 | 5/1963 | Kralowetz | 91—27 |

PAUL E. MASLOUSKY, Primary Examiner

U.S. Cl. X.R.

60—54.5; 91—448; 92—131